March 9, 1948. L. SCHOTTGEN ET AL 2,437,618
BEER DELIVERY AND DISPENSING APPARATUS
Filed Oct. 12, 1943 3 Sheets-Sheet 1
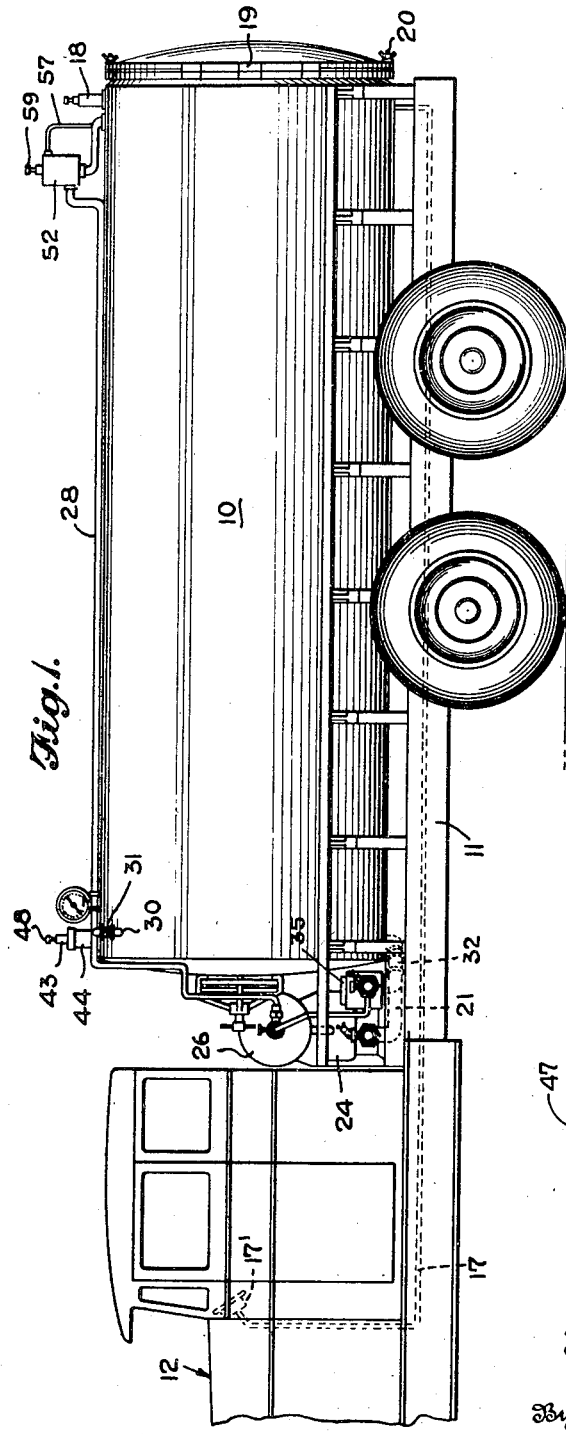
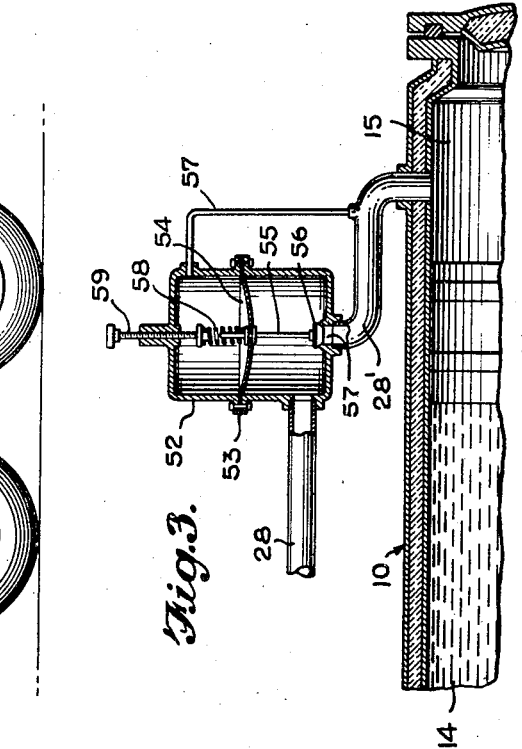
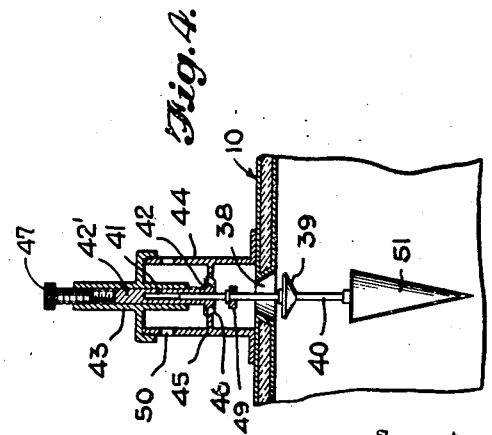
Inventors
Louis Schottgen
Madeline J. Parkerton
By
Attorney

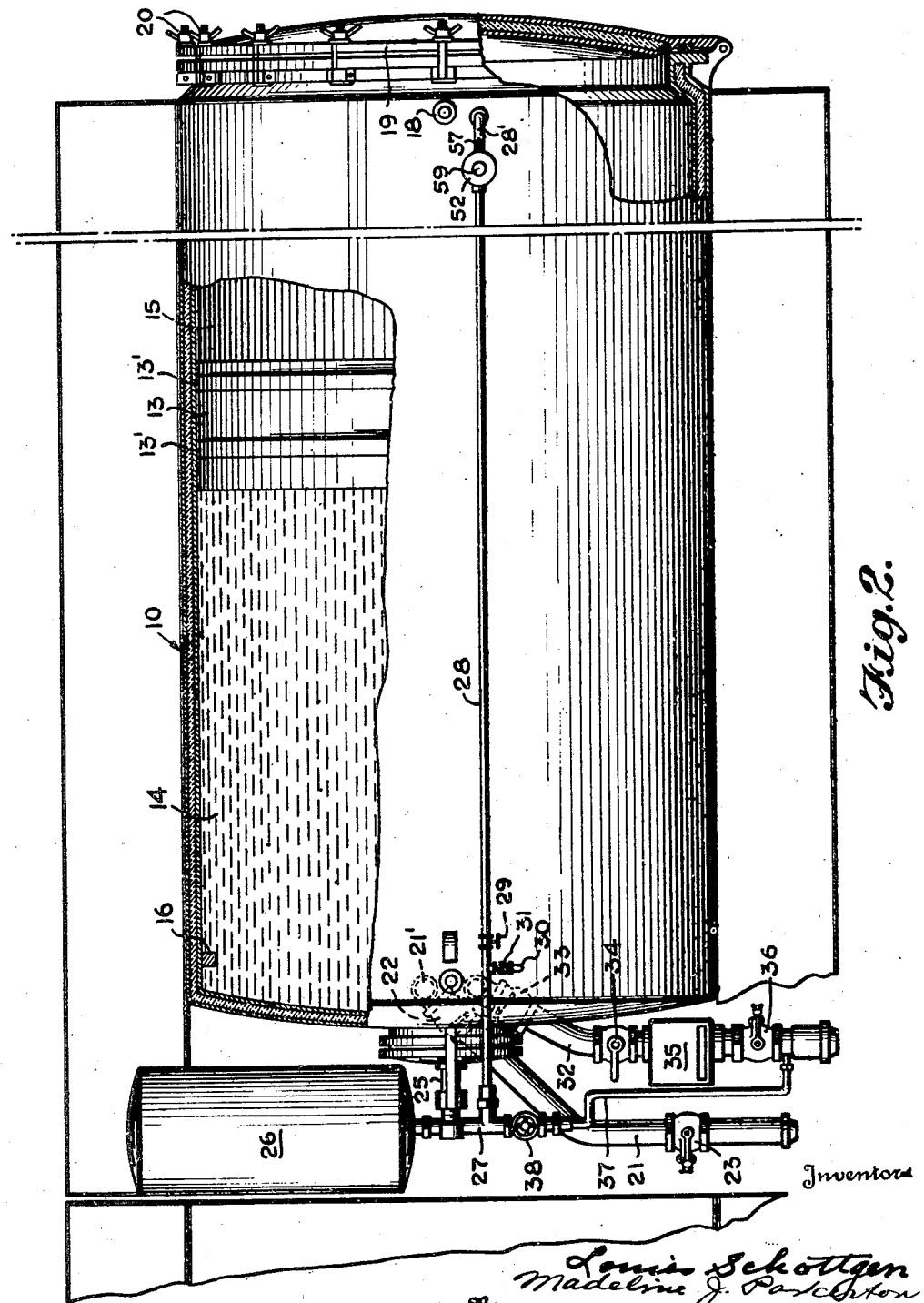

March 9, 1948.   L. SCHOTTGEN ET AL   2,437,618
BEER DELIVERY AND DISPENSING APPARATUS
Filed Oct. 12, 1943   3 Sheets-Sheet 3

Inventors
Louis Schottgen
Madeline J. Parkerton
By A. Yates Dowell
Attorney

Patented Mar. 9, 1948

2,437,618

UNITED STATES PATENT OFFICE 2,437,618

BEER DELIVERY AND DISPENSING APPARATUS

Louis Schottgen, Penwell, N. J., and Madeline J. Parkerton, New York, N. Y.

Application October 12, 1943, Serial No. 505,992

6 Claims. (Cl. 222—389)

This invention relates to apparatus for delivering and dispensing beer and analogous fermented liquids.

It has long been known that beer and analogous fermented beverages are most healthful and palatable when maintained at approximately 6 to 8 pounds per square inch at a temperature of 41° F. In the case of beer, the natural carbon dioxide gas in the brewed product gives the latter a pressure within this range.

To transport beer from the brewery to the point of dispensation requires a particular type of apparatus, otherwise the pressure will be unnaturally high and also there will be a fluctuation of pressure and agitation of beer which detracts from its beverage qualities. It has heretofore been proposed to utilize apparatus for transporting beer which will function to maintain the beer at the desired pressure and also avoid undesirable agitation, such apparatus being disclosed in the patents to Schottgen, No. 1,047,452 and No. 1,892,519. While this proposed apparatus is theoretically based on sound principles, it is subject to considerable improvement from a practical standpoint, and an object of the present invention is to so improve such apparatus as to effectively cope with modern conditions and render the apparatus effective to carry out its function with the utmost efficiency.

The present application is a continuation in part of our copending application Serial Number 331,475 which has now become abandoned.

In the drawings:

Fig. 1 is a view in side elevation of a truck having thereon a tank constructed in accordance with the features of the present invention;

Fig. 2 is a top plan view of Fig. 1, partly broken away to illustrate interior construction;

Fig. 3 is a substantially central vertical section of a pressure equalizing valve and coacting parts and whereby the pressure on the beer in the tank is maintained constant;

Fig. 4 is a view similar to Fig. 3 of a valve for venting air from the tank during the filling operation;

Figure 5:
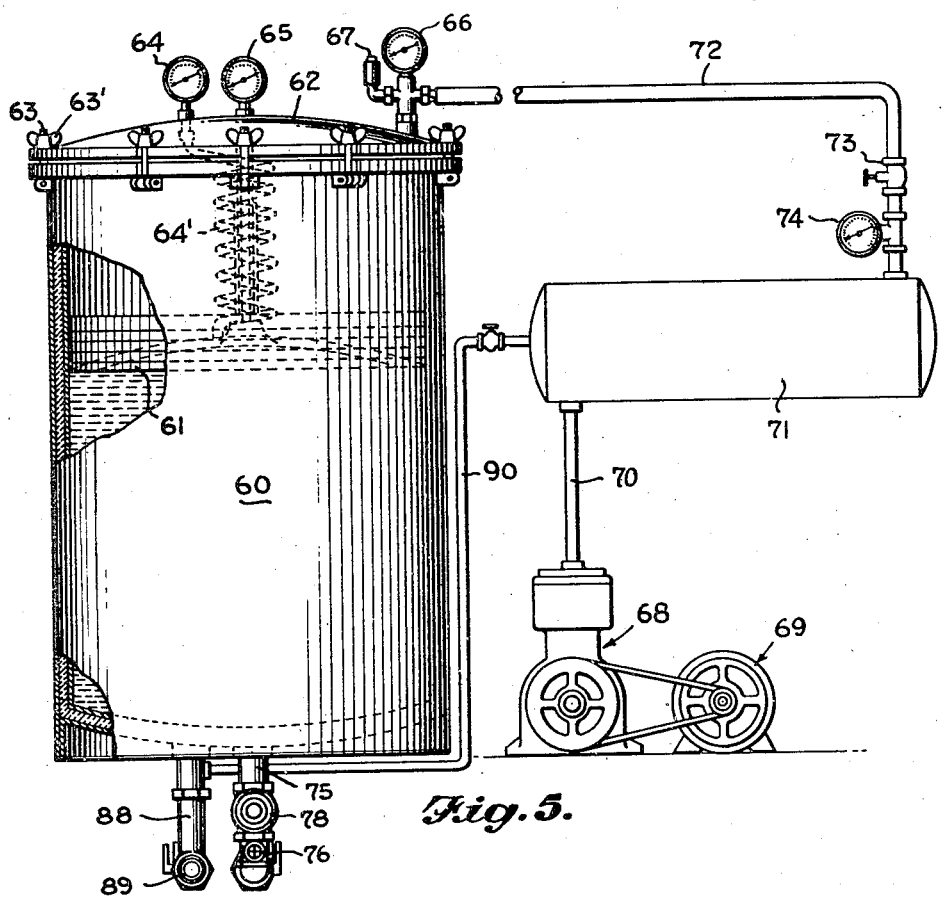
Fig. 5 is a view in elevation, partly broken away, of a preferred type of a dispensing apparatus.

The apparatus herein disclosed will permit loading of the beer into the tank shown in Figs. 1 and 2 and enable the beer to be maintained under a predetermined relatively low pressure not exceeding 15 pounds per square inch during the loading operation and while transporting the beer to and loading it into the dispensing tank of Fig. 5.

Referring to the drawings in detail, a horizontal transportation tank is generally indicated at 10 and is provided with walls which are insulated to reduce heat flow to a minimum and avoid a change in temperature of, for example, more than 4° over an eight hour period, said tank being mounted upon a chassis 11 of a truck or analogous vehicle generally indicated at 12. While the means for transporting the tank is shown as being a truck, it will be understood that the tank may be placed upon a car, vessel or other means of conveyance. The interior walls of the tank should be made of sanitary metal, such as stainless steel or aluminum.

A freely movable airtight piston 13 is mounted in the tank, said piston preferably being of relatively light material having a slightly concave face and provided with sealing rings 13'. This piston is slidably mounted within the tank for free movement axially thereof as shown in Fig. 2. The tank 10 may be considered as being divided by the piston 13 into two compartments or chambers, a liquid compartment 14 and an air compartment 15. At the forward extremity of the liquid compartment a stop member in the form of a ring 16 is mounted and serves to limit the extreme forward travel of the piston 13. The air compartment 15 is provided with a gauge line 17 which extends to a pressure gauge 17' located in the driver's compartment, so that a pressure reading is always available to the driver. An adjustable air relief valve 18 is also provided for the compartment 15 and may be set to release at a certain maximum, for example fifteen pounds per square inch. The rear end of the tank is provided with a hinged door or gate 19 which fits against the adjacent end wall of the tank and is secured in position through the medium of a plurality of pivoted clamping bolts 20. The door is also preferably insulated in a manner similar to the walls of the tank 10.

The tank is filled through a coupling pipe 21 which opens into the tank at the front end of the latter, as indicated at 21', a check valve 22 being interposed in the pipe 21 adjacent the inlet 21'. The pipe 21 is also provided with a shut-off valve 23.

The piston 13 is preferably actuated by means of compressed air, and accordingly a compressor 24 is provided and communicates through line 25 with a reserve air tank 26. Air from the tank 26 is conducted through outlet pipe 27 and lines 28, 28' to the air compartment 15 of the tank 10. The line 28 preferably has therein a shutoff valve 29, and in advance of this valve is a branch line 30 which communicates with the liquid compartment 14 and is also provided with a shutoff valve 31. The valves 29 and 31 permit the piston 13 to be actuated in either direction through the medium of air pressure. Thus, by closing the valve 29 and opening the valve 31, air is shut off from the compartment 15 and diverted into compartment 14 to thereby move the piston rearwardly in the tank 10, and by closing valve 31 and opening valve 29, the piston may be caused to move in the opposite direction.

Beer is discharged or unloaded from the main tank 10 through delivery pipe 32 having a check valve 33 therein adjacent the point where the pipe communicates with the tank, and also a shutoff valve 34, a meter 35 and another shutoff valve 36 beyond the meter.

In order to force air into the delivery hose and clear the latter of residual beer when the approximate amount required has been delivered to the dispensing tank (to be described), air under pressure may be diverted into the discharge pipe 32 through line 37 having a shutoff valve 38' therein.

The beer is taken from a brewer's vat by a flexible hose, not shown, attached to the inlet pipe 21. Due to the heighth from which the beer comes as well as the actual pressure within the beer, the pressure on the beer flowing from the vat will be in the neighborhood of 15 pounds or better. The beer flowing into the inlet pipe 21 will force the piston 13 back toward the rear of the tank (it being assumed that said piston is at the forward end of the tank when the loading operation starts) while maintaining the beer in the liquid compartment at a substantially even relatively low pressure.

As the liquid compartment fills, entrapped air will be released through port 38, note Fig. 4, which is controlled by a valve assembly including a valve closure member 39 secured on a stem 40, the latter at its upper extremity slidably projecting into a bore 41 formed in the stem 42' of a one-way air release valve 42, the said stem 42' in turn being mounted for free sliding movement in a valve housing cover 43 which is removably secured on a housing 44. The housing 44 is spanned by a wall 45 having an air vent or port 46 therein which is controlled by the valve 42 formed on the lower end of the stem 42'. The upper limit of travel of the freely-slidable stem 42' is adjustable by means of screw 47 or said screw may be adjusted to a point where it will positively hold the valve 42 to its seat. An additional guide 48 is provided for the stem 40 and is secured to or forms part of the housing 44, and the valve stem 40 is provided with a contact member 49. The upper extremity of the housing 44 is provided with exhaust vents or openings 50.

The lower extremity of the stem 40 has secured thereto a float 51 which is of pointed or tapered construction in order that its action may be delayed until after any foam which may be present on the surface of the beer will have passed beyond the lower extremity of said float and the float will be acted on by the liquid rather than by the foam itself.

The valve just described operates as follows:

When beer is admitted into the liquid compartment 14, air can escape from but cannot enter into the tank due to the gravity seating of the valve 42. However, when the beer reaches a height above the lower tapered extremity of the float 51, it will act on said float to move the stem 40 upwardly causing the closure member 39 to close the port or exhaust vent 38, thereby sealing the tank against escape of beer. It is therefore apparent that rearward movement of the piston 13 will not take place until the space between the piston 13 and the forward wall of the tank is completely filled with beer, thus insuring a solid charge of beer in the compartment 14 under all conditions of load except when the tank is empty. This elimination of any air space in the liquid compartment 14 effectively prevents undesirable agitation of the beer during transportation.

To unload the beer into the dispensing tank of Fig. 5, air under pressure is directed into the compartment 15 through the air line 28 to force the piston 13 forwardly against the beer in the compartment 14. Ordinarily, a pressure of approximately 15 pounds is sufficient in the air compartment 15 to unload the beer to the dispensing tank. The compressor 24, for all practical purposes, is adapted to run intermittently so that when a certain pressure is reached, it automatically cuts off. The pressure behind the piston 13, however, should be more or less constant, and to maintain this desirable condition, it is preferred to employ a differential valve arrangement of the type shown in Fig. 3.

This equalizing valve assembly consists of a housing 52, which is comprised of upper and lower sections provided with flanges 53 and whereby a diaphragm 54 may be secured between said sections. Projecting through and secured for movement with the diaphragm is a valve stem 55 having a closure member 56 on the lower end thereof and adapted to control a port 57 at the inlet end of pipe 28'. A by-pass tube or line 57' is connected at opposite ends respectively to the pipe 28' and the upper part of the housing 52, so that pressure in the compartment 15 is communicated to the upper side of the diaphragm 54. The diaphragm flexes upwardly against the tension of a differential spring 58 adjustable through the medium of a screw 59.

The valve just described operates as follows:

When air is forced into the line 28 from the reserve tank 26, it passes into the lower chamber of the housing 52 and acts on the diaphragm 54 to unseat the valve member 56 and permit air to pass into the compartment 15 through pipe 28'. However, should the pressure in the compartment 15 rise beyond a certain point determined by adjustment of the screw 59, it will act on the upper side of the diaphragm 54 to flex the latter downwardly and cause the valve member 56 to close the port 57. Thus by adjusting the screw 59, a predetermined pressure may be maintained in the compartment 15.

Fig. 5 illustrates a preferred type of dispensing tank for use in carrying out the method toward which the present invention is directed. The tank is generally indicated at 60 and is preferably insulated in a manner similar to the transportation tank 10. A freely movable airtight piston 61 is mounted in the tank 60 and may be substantially similar to the piston 13. The tank 60 operates to hold the beer as a solid body and prevents separation therefrom of the natural gas inherent therein. The tank is preferably disposed vertically and may be located at any place convenient for dispensation. The top of the tank is provided with an insulated cover 62 which is removably bolted in place by swivel bolts 63 and wing nuts 63'. A pressure gage 64 is located in the top of cover 62 and communicates through a length of flexible tubing 64' with the interior of the tank through the piston 61. Also a gage 65 is located in the cover 62, to indicate the quantity of liquid in the tank. Another gage 66 indicates the air pressure in the air compartment portion of the tank, and in conjunction with this gage an air relief valve 67 is provided and should be adjusted to maintain a pressure on the beer and liquid compartment of the tank sufficient to send beer to the tap at between 7 and 9 pounds.

The tank is supplied with compressed air by means of a compressor 68 driven from motor 69 and communicating through line 70 with reserve tank 71, the latter in turn communicating with the air compartment of the tank 60 through line 72. The latter line is provided with a shut-off valve 73 and pressure gage 74.

Air delivered into the air compartment of the tank 60 should be filtered in order to avoid any chance of contamination of the beer in the tank.

Figure 6:
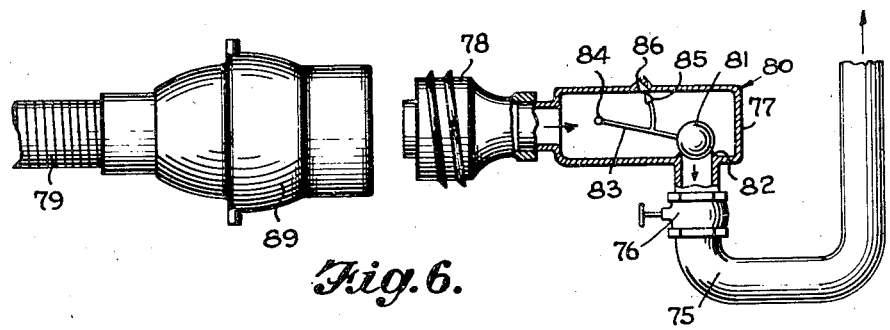
Fig. 6 is a disassembled view of a preferred type of lock coupling for the filler pipe or line for the tank of Fig. 5 and also showing in section a valve arrangement which permits complete evacuation of beer from the filler hose.

Beer is loaded into the liquid compartment of the dispensing tank 60 through the bottom of the latter by means of inlet pipe or conduit 75, provided with a shut-off valve 76, a float valve chamber or housing 77 and a coupling head 78, note Fig. 6.

In filling the dispenser tank, it is desirable that all residual beer be flushed from the loading hose or conduit, a portion of which is indicated at 79. Accordingly, the valve chamber 77 has mounted therein a float valve 81 adapted to control inlet port 82 of the inlet pipe 75. The valve 82 is mounted on a stem 83 pivotally connected as at 84 to the wall of the chamber 77. Connected to this stem is a needle valve 85 adapted to control air vent 86 formed in the upper wall of the chamber 77.

The loading hose or conduit 79 is provided with a coupling head 89' adapted to engage and lock with coupling head 78, the said coupling heads 78 and 89' preferably being constructed as illustrated in the patent to Parkerton, No. 2,154,526, granted April 18, 1939, and which is so constructed as to permit only authorized persons to make a loading connection with the filler pipe 75.

After the tank 60 has been loaded with the desired quantity of liquid, all residual liquid is expelled from the hose 79 by means of the line 37 (Fig. 2) controlled by the valve 38. Since there will be liquid in the valve chamber 77 as long as any residual liquid remains unexpelled, the float valve 81 will be raised clear of its seat 82 and the needle valve 85 will close the exhaust port 86; but as soon as the liquid has been substantially flushed from the loading hose and passes out of the chamber 77 into the pipe 75, the float valve 81 will drop onto its seat and the needle valve 85 will clear the exhaust vent 86, permitting air to escape from the chamber 80 and preventing infiltration of air into the beer in tank 60. Exhaust from the vent 86 also gives an indication of the fact that the line has been flushed clear of liquid.

The tank 60 is provided with a dispensing conduit 88 having valve 89 therein. After liquid has been dispensed, any residual beer in conduit 88 may be blown out by pipe connection 90 to storage tank 71.

A brief description of operation of the complete apparatus follows:

In filling the tank 10, a suitable connection is made from the brewers vat, not shown, to the filler pipe 21, it being assumed that the piston 13 is in a forward position against the stop ring 16. The normal pressure of the beer in the vat will be sufficient to fill the liquid compartment 14 and force the piston 13 rearwardly. As the beer rises in the liquid compartment 14, any entrapped air is released through the port 38 (Fig. 4), and which port is closed when the liquid reaches a level adjacent the top of the tank. After the liquid compartment 14 has been loaded, the tank 10 may be transported any desired distance without any danger of undue agitation on the beer, the latter being maintained at a relative low pressure at all times. When the dispensing tank 60 is reached, a connection is made with the filler pipe 75, and the valve 29, Fig. 2, is turned on and air is admitted from the reserve tank 26 into the air compartment 15 of the tank 10, forcing the piston 13 forwardly against the beer and causing the latter to pass into the tank 60. By adjusting the tension of the spring 58 for the diaphragm 54 (Fig. 3), the desired pressure may be maintained in the compartment 15 to effect the transfer of the beer into the tank 60 and which pressure will be maintained constant during the entire transporting and loading operations. When the piston reaches the stop ring 16, the valve 31 in the line 30 is opened to flush the beer from the liquid compartment 15 in the space beyond the ring 16 and also through the pipe 32 and meter 35. If desired, this air feed may be used in place of the line 37 or in conjunction with the latter to flush residual beer from the conduit 79.

It will be seen that the apparatus is capable of transporting beer within the desired low pressure range and with a minimum of agitation. At no time need the beer be subjected to any relatively high pressure, irrespective of loading conditions.

It will be understood that certain changes in construction and design may be adopted without departing from the spirit or scope of the invention as defined by the appended claims.

What is claimed is:

1. Apparatus for transporting beer under relatively low pressure comprising a horizontal transporting tank having a freely movable air-tight piston dividing said tank into a liquid compartment and an air compartment, a stop member in said tank for limiting the forward travel of said piston, visible means for indicating the pressure in said tank, an adjustable air release valve communicating with said air compartment and constructed to be set to release at a definite pressure thus preventing a pressure rise in said air compartment above a predetermined maximum, means providing a source of compressed air for actuating said piston and for exerting pressure in said compartments, means for selectively directing said air into each of said compartments, float valve means permitting escape of air from said beer compartment, said valve means including a float surface of a configuration resulting in insufficient buoyancy to actuate said valve when immersed in foam but sufficient to actuate said valve when in a liquid and adjustable pressure responsive means for controlling the flow of air to maintain a predetermined pressure in one of said compartments.

2. Apparatus for transporting beer and analogous fermented liquids at a relatively low pressure, comprising the combination with a horizontal transportation tank having a freely movable air-tight piston therein dividing the tank into a liquid compartment and an air compartment, means for conducting liquid to said liquid compartment to load the tank, the liquid forcing the piston rearwardly in said air compartment, and means for conducting air under pressure to said air compartment to drive the piston against the liquid and unload the tank, of means for venting air from said liquid compartment during the loading operation and prior to movement of the piston rearwardly, said means including a valve member having a float projecting into the liquid compartment for contact with the liquid, said float having an elongated lower extremity adapted to project through any foam present on the surface of the liquid and be acted on only by the liquid in the liquid compartment and means for maintaining a constant predetermined pressure in said air compartment during the loading, transporting, and unloading operations.

3. Apparatus for transporting beer and analogous fermented liquids at a relatively low pressure, comprising the combination with a horizontal transportation tank having a freely movable air-tight piston therein dividing the tank into a sealed liquid compartment and an air compartment, means for conducting liquid to said liquid compartment to load the tank, the liquid forcing the piston rearwardly in said air compartment, and means for conducting air under pressure to said air compartment to drive the piston against the liquid and unload the tank, of means for venting air from said liquid compartment during the loading operation and prior to movement of the piston rearwardly, said means including a valve assembly comprising a housing fixed to the top of the tank and having a wall formed with an air-exhaust port, a one-way air valve mounted for free sliding gravity movement in said housing for controlling said exhaust port, the wall of the tank within said valve housing being also formed with an air-exhaust port, and a valve closure member for said latter port coacting with but mounted for movement independently of said air valve, said closure member having a stem with a float on the lower end thereof which projects downwardly into the tank and through any foam present on the surface of the liquid to be acted on only by the liquid in the liquid compartment, and means for maintaining a constant predetermined pressure in said air compartment during the loading, transporting, and unloading operations.

4. Apparatus for transporting beer and analogous fermented liquids under relatively low pressure, comprising the combination with a transportation tank and a dispensing tank, said transportation tank occupying a horizontal position and having a freely movable air-tight piston therein dividing the tank into a liquid compartment and an air compartment, means for conducting liquid to said liquid compartment to load the tank and means for conducting air under pressure to said air compartment to unload the tank, and a conduit for conducting liquid from the liquid compartment of the transportation tank to a loading inlet for said dispensing tank, of means for injecting air under pressure in said conduit to expel residual beer therefrom, and means associated with the inlet to said dispensing tank and the discharge end of said conduit whereby when liquid has been completely expelled from said conduit the inlet to the dispensing tank will be closed to prevent entrance of air into the latter and means for maintaining a constant predetermined pressure in said air compartment during the loading, transporting, and unloading operations.

5. Apparatus for transporting beer and analogous fermented liquids under relatively low pressure, comprising the combination with a transportation tank and a dispensing tank, said transportation tank occupying a horizontal position and having a freely movable air-tight piston therein dividing the tank into a liquid compartment and an air compartment, means for conducting liquid to said liquid compartment to load the tank and means for conducting air to said air compartment to unload the tank, said dispensing tank being provided with a loading inlet, and a conduit connecting said liquid compartment with said inlet, of means for conducting air under pressure to said conduit to expel residual beer therefrom, and a valve associated with said inlet and arranged to automatically close the latter when liquid has been completely expelled from said conduit and prevent air from passing into the dispensing tank and means for maintaining a constant predetermined pressure in said air compartment during the loading, transportation, and unloading operations.

6. Apparatus for transporting beer and analogous fermented liquids under relatively low pressure, comprising the combination with a transportation tank and a dispensing tank, said transportation tank occupying a horizontal position and having a freely movable air-tight piston therein dividing the tank into a liquid compartment and an air compartment, means for conducting liquid to said liquid compartment to load the tank and means for conducting air to said air compartment to unload the tank, said dispensing tank being provided with a loading inlet, a conduit connecting said liquid compartment with said inlet, and means for conducting air under pressure to said conduit to expel residual beer therefrom, of a valve associated with said inlet including a valve housing having an air vent and a float valve controlling the inlet adapted to be raised by liquid and a needle valve associated with said float valve for controlling the air vent and adapted to be moved into closed position when said float valve is raised, the float valve dropping down into closed position after liquid has been completely evacuated from said conduit and opening said air vent to permit air to escape without passing into the dispensing tank and means for maintaining a constant predetermined pressure in said air compartment during the loading, transportation and unloading operations.

LOUIS SCHOTTGEN.
MADELINE J. PARKERTON.

REFERENCES CITED

The following references are of record in the file of this patent:

UNITED STATES PATENTS

| Number | Name | Date |
| --- | --- | --- |
| 691,980 | Spietschka | Jan. 28, 1902 |
| 715,534 | Atchison | Dec. 9, 1902 |
| 987,892 | Lane | Mar. 28, 1911 |
| 1,047,452 | Schottgen | Dec. 17, 1912 |
| 1,137,718 | Sahlender | Apr. 27, 1915 |
| 1,276,502 | Duffy | Aug. 20, 1918 |
| 1,526,001 | Larue | Feb. 10, 1925 |
| 1,657,112 | Doughty | Jan. 24, 1928 |
| 1,892,519 | Schottgen | Dec. 27, 1932 |
| 2,063,727 | Davis | Dec. 8, 1936 |
| 2,088,073 | Voight | July 27, 1937 |